United States Patent [19]
Zboralski et al.

[11] Patent Number: 4,884,215
[45] Date of Patent: Nov. 28, 1989

[54] AIRFLOW SENSOR AND CONTROL CIRCUIT

[75] Inventors: James A. Zboralski, Clawson; Darryl A. Hock, Harper Woods; David L. Kaleita, Hamtramck, both of Mich.

[73] Assignee: Jabil Circuit Company, Madison Heights, Mich.

[21] Appl. No.: 19,968

[22] Filed: Feb. 27, 1987

[51] Int. Cl.$^4$ .................................. G01F 1/68
[52] U.S. Cl. .................... 364/510; 73/118.2; 73/204.14
[58] Field of Search .............. 364/510, 571.01; 73/204, 204.18, 204.17, 204.14, 204.15, 118.2; 341/158, 140

[56] References Cited

U.S. PATENT DOCUMENTS

| | | | |
|---|---|---|---|
| 4,043,195 | 8/1977 | Hunting | 364/510 |
| 4,089,214 | 5/1978 | Egami et al. | 73/116 |
| 4,193,300 | 3/1980 | Peter | 73/204 |
| 4,475,392 | 10/1984 | Ajagu et al. | 73/432 R |
| 4,578,996 | 4/1986 | Abe et al. | 73/204 |
| 4,616,332 | 10/1986 | Robinson et al. | 341/158 |
| 4,649,745 | 3/1987 | Kondo et al. | 73/204 |
| 4,680,964 | 7/1987 | Sato et al. | 73/204 |
| 4,683,539 | 7/1987 | Kanno et al. | 364/431.05 |
| 4,713,765 | 12/1987 | Abe et al. | 364/431.05 |
| 4,794,794 | 1/1989 | Djorup | 73/204 |

Primary Examiner—Parshotam S. Lall
Assistant Examiner—S. A. Melnick
Attorney, Agent, or Firm—Harness, Dickey & Pierce

[57] ABSTRACT

The airflow sensor uses a flow sensing bridge having a thermal element which senses airflow as a function of electrical energy applied to the bridge. Energy is applied to the bridge to maintain the thermal element at a constant temperature and constant resistance. A differential amplifier monitors the balanced and unbalanced state of the bridge and controls the application of energy to the bridge to maintain a balanced state. A microcomputer with analog to digital converter senses the level of energy applied to the bridge and converts this energy level to a digital signal indicative of airflow. The raw digital signal is corrected using calibration lookup tables and thermal compensation correction tables in the microcomputer memory circuits. The microcomputer outputs a variable frequency signal indicative of the measured mass airflow. In the alternative to the differential amplifier, the bridge may be balanced using the microcomputer in a sample and hold voltage to current converter configuration.

13 Claims, 3 Drawing Sheets

AIRFLOW SENSOR AND CONTROL CIRCUIT

BACKGROUND AND SUMMARY OF THE INVENTION

The present invention relates generally to airflow sensors for automotive vehicles. More particularly, the invention relates to an airflow sensor which uses a microcomputer-based digital control circuit for improved accuracy, better performance and easier calibration.

With today's emphasis on pollution control, economy and engine efficiency, vehicle engines are becoming quite sophisticated. Today's vehicles employ one or more onboard computer systems with associated sensors for monitoring vital engine operating parameters, in order to minimize pollution and to maximize economy and engine efficiency. One such vital parameter is airflow. Airflow has a direct bearing on engine performance and also indirectly indicates engine loading.

Airflow sensors are conventionally used to provide the vehicle onboard computer with a signal indicative of the mass airflow at a given point in time. Traditionally, the mass airflow sensor has been a major source of error, giving rise to both poor performance, poor efficiency, and unacceptable pollution control. The conventional hot wire mass airflow sensor operates on the wind chill principle. The conventional hot wire sensor has a thermal foil element positioned within a flow confining venturi conduit connected to the air intake system of the vehicle. The thermal foil element is connected to a Wheatstone bridge circuit which receives electrical energy from a power source to heat the thermal foil element to a predetermined temperature. As the mass airflow across the thermal foil element increases, the temperature of the element drops causing a corresponding decrease in the resistance of the thermal element. This decrease unbalances the bridge circuit. By adding electrical energy to the bridge circuit, the temperature of the thermal foil element can be brought back to the original predetermined temperature, whereupon the resistance of the element returns to its original value and the bridge circuit is once again balanced. Thus the level of electrical energy applied to the supply node of the bridge circuit gives an indication of the mass airflow across the thermal foil element.

While workable in theory, the above-described conventional mass airflow sensor is difficult to calibrate and expensive to mass produce. Also, as the device responds to temperature change in the thermal foil element, it is also susceptible to inaccuracies due to changes in the ambient air temperature. While thermistor circuits have been used to take ambient air temperature into account, these circuits do not fully correct the problem, since the ambient air temperature can affect in a nonlinear fashion the sensor's response to changes in mass airflow.

The control circuit for a conventional mass airflow sensor is an analog circuit comprising a bridge control circuit for maintaining the bridge in a balanced condition by regulating the quantity of electrical energy applied to the supply node of the bridge. The conventional analog circuit also comprises temperature compensation amplifiers and calibration amplifiers which, to a limited degree, compensate for inaccuracies of the bridge circuit to provide an analog voltage indicative of the mass airflow. This analog voltage is fed to a voltage controlled oscillator which produces a variable frequency signal indicative of the mass airflow.

In order to initially calibrate the conventional sensor, the resistors comprising the Wheatstone bridge must be carefully matched to ensure an initial balanced condition. This is conventionally done by using laser trimmed resistors. Laser trimmed resistors add greatly to the cost of the sensor, since each sensor must be placed in a test rig to permit the resistors to be trimmed by laser to the correct balance point. This is a costly process.

Aside from the disadvantages of requiring laser trimmed resistors, the conventional control circuit does not compensate well for variations in temperature, nor does it afford accurate calibration over the entire operating range.

The present invention provides a digital microcomputer-based circuit which in one embodiment can eliminate the need for expensive and time-consuming laser trimmed components. The invention also provides significantly greater accuracy and temperature fluctuation immunity than the conventional analog circuit. The invention provides a control circuit for an airflow sensor or mass airflow sensor of the type employing a flow sensing bridge having a thermal element which senses airflow as a function of electrical energy applied to the bridge. The bridge has a supply node to which electrical energy is applied and the bridge has first and second control nodes for providing an indication of the balanced and unbalanced state of the bridge.

In one embodiment, the control circuit comprises a differential amplifier for coupling to a source of electrical energy and having first and second inputs coupled to the first and second control nodes. The differential amplifier is also coupled to the supply node of the bridge circuit. The differential amplifier senses the balanced and unbalanced state of the bridge and controls the electrical energy applied to the supply node to maintain the bridge in a substantially balanced state.

The control circuit further comprises a microcomputer having a data input channel, a memory circuit and a serial communication output channel. The data input channel is coupled to the supply node of the bridge for providing the microcomputer with a first signal indicative of the electrical energy applied to the bridge. The memory circuit is preprogrammed to provide the microcomputer with instructions for converting the first signal into a second alternating signal of variable frequency at the output channel. The frequency is indicative of the measured airflow and is thus in a form for use by onboard vehicle computers.

In another embodiment of the invention, the control circuit comprises a microcomputer having first, second and third data input channels, a serial communication output channel and a second output channel. The first data input channel is coupled to the supply node of the bridge for providing the microcomputer with a first signal indicative of the electrical energy applied to the bridge. The second and third data input channels are coupled to the first and second control nodes for providing the microcomputer with an indication of the balanced and unbalanced state of the bridge.

A bridge control circuit is coupled to the second output channel of the microcomputer and also to the supply node of the bridge. The bridge control circuit has a terminal for coupling to a source of electrical energy. It controls the electrical energy applied to the supply node in response to balancing signals from the microcomputer.

The memory circuit of the microcomputer is preprogrammed to provide the microcomputer with instructions for generating the balancing signals used to maintain the bridge in a substantially balanced state and is also preprogrammed to provide the microcomputer with instructions for converting the first signal into a second alternating signal of variable frequency. The frequency is indicative of the measured airflow and is thus usable by onboard vehicle computers.

In both embodiments the microcomputer includes an analog to digital converter circuit comprising the data input channel coupled to the supply node of the bridge. The analog to digital converter has a data signal input terminal and an analog reference input terminal. The analog reference input terminal is coupled to the supply node of the bridge for providing the microcomputer with the first signal, indicative of the electrical energy applied to the bridge. The data signal input is coupled to a reference source. This causes the analog to digital converter to achieve a nonlinear response, with better than linear response accuracy at low mass airflow rates. This arrangement achieves, with an eight bit device, a ten bit or better resolution at low mass airflow rates commonly encountered in vehicle monitoring applications. The invention thus enjoys the accuracy of a ten bit analog to digital circuit at the substantially lower cost of an eight bit circuit. The cost savings at mass production volumes is considerable.

Moreover, the microcomputer can monitor ambient temperature and may be preprogrammed with temperature compensation and calibration correction tables, preferably in the form of lookup tables, to correct for any nonlinearities or inaccuracies in the bridge circuit. Ambient temperature readings can be output by the microcomputer over the variable frequency output signal, making the sensor even more versatile. Using the microcomputer to balance calibration the bridge renders a much simpler and more economical process of matching the lookup table values to the particular bridge circuit. Laser trimming is no longer required.

Another advantage of the microcomputer-based control circuit is that it provides a convenient upgrade path for changing the type of output signal being sent to the onboard vehicle computer. Present-day vehicles expect an alternating voltage of variable frequency within certain predefined ranges to indicate the mass airflow measurement. As new vehicles are designed, it is not unrealistic to expect that the type of signals may change. For example, it is anticipated that the output frequency range may need to be increased in the future in order to improve system performance. Such a change may be conveniently implemented in the present invention by simply reprogramming the memory circuits. In the alternative, it may be possible that the onboard computer of future vehicles may communicate digitally with remote sensors. In this event, the microcomputer of the invention is well suited to provide this digital communication.

The advantages of the present invention are many. For a more complete understanding of the invention and its objects and advantages, reference may be had to the following specification and to the accompanying drawings.

DESCRIPTION OF THE PREFERRED EMBODIMENTS

Figure 1:
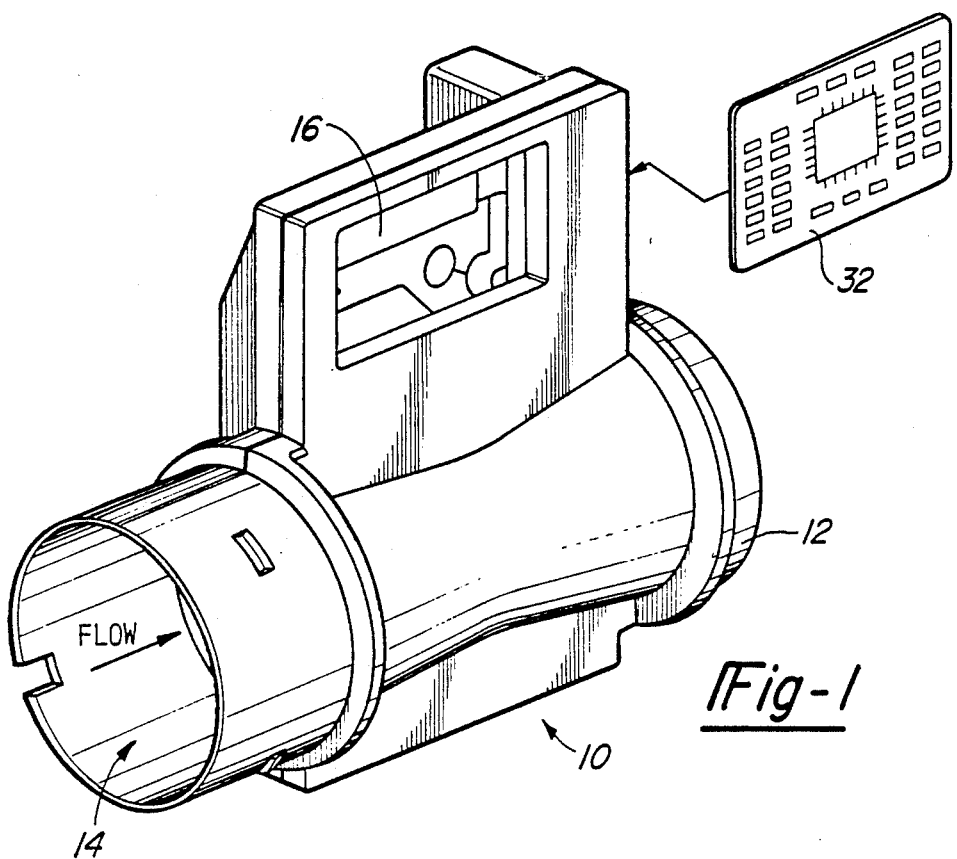
FIG. 1 is a perspective view of the airflow sensor of the invention, illustrating the control circuit in exploded perspective view.
Figure 2:
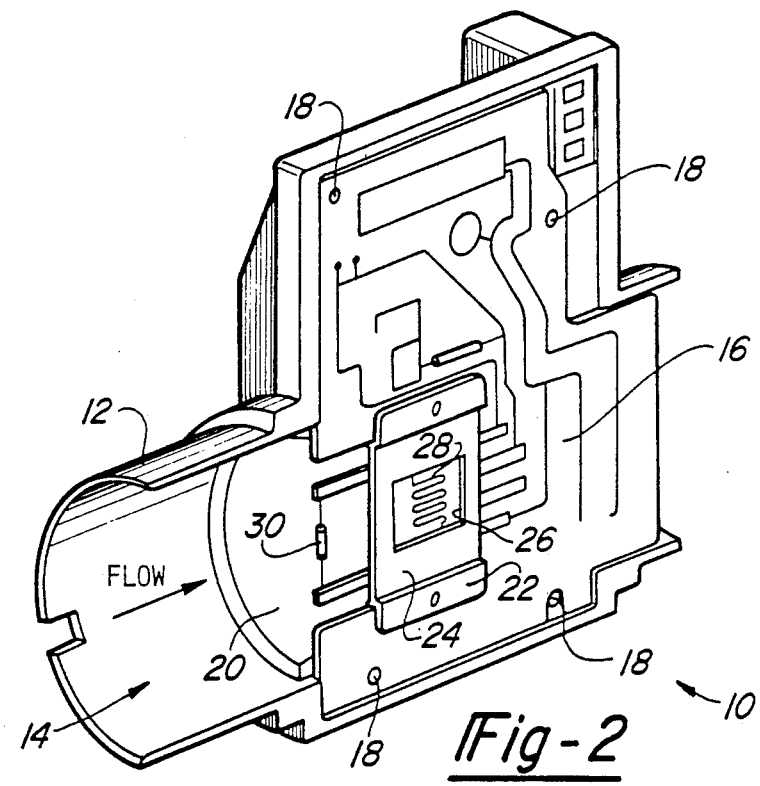
FIG. 2 is another view of the airflow sensor of the invention with the cover removed to reveal the sensor electronic components.

Referring first to FIGS. 1 and 2, the airflow sensor is illustrated generally at 10. The sensor comprises a plastic housing 12 which defines a flow confining path 14. The housing is preferably fabricated as two halves which fit together around a ceramic circuit board 16. The circuit board 16 is held in registration by positioning lugs or screws 18. The flow confining path is preferably constructed in the form of a restricted orifice or venturi conduit 20. Airflow through the conduit is in the direction of the arrow labeled "FLOW."

Ceramic circuit board 16 supports a thermal foil assembly 22 which comprises a plastic mounting template 24 with window 26. Positioned in the window is the thermal foil element 28. A temperature sensor thermistor 30 is mounted in front of the foil element 28.

The control circuit for the mass airflow sensor is illustrated generally at 32. The control circuit may be fabricated on a separate circuit board preferably using surface mount technology, or it may be incorporated onto the ceramic circuit board 16. Power for the control circuit and the appropriate interconnections to the thermal foil element and associated components is made through bonding pads provided on the ceramic circuit board.

Figure 3:
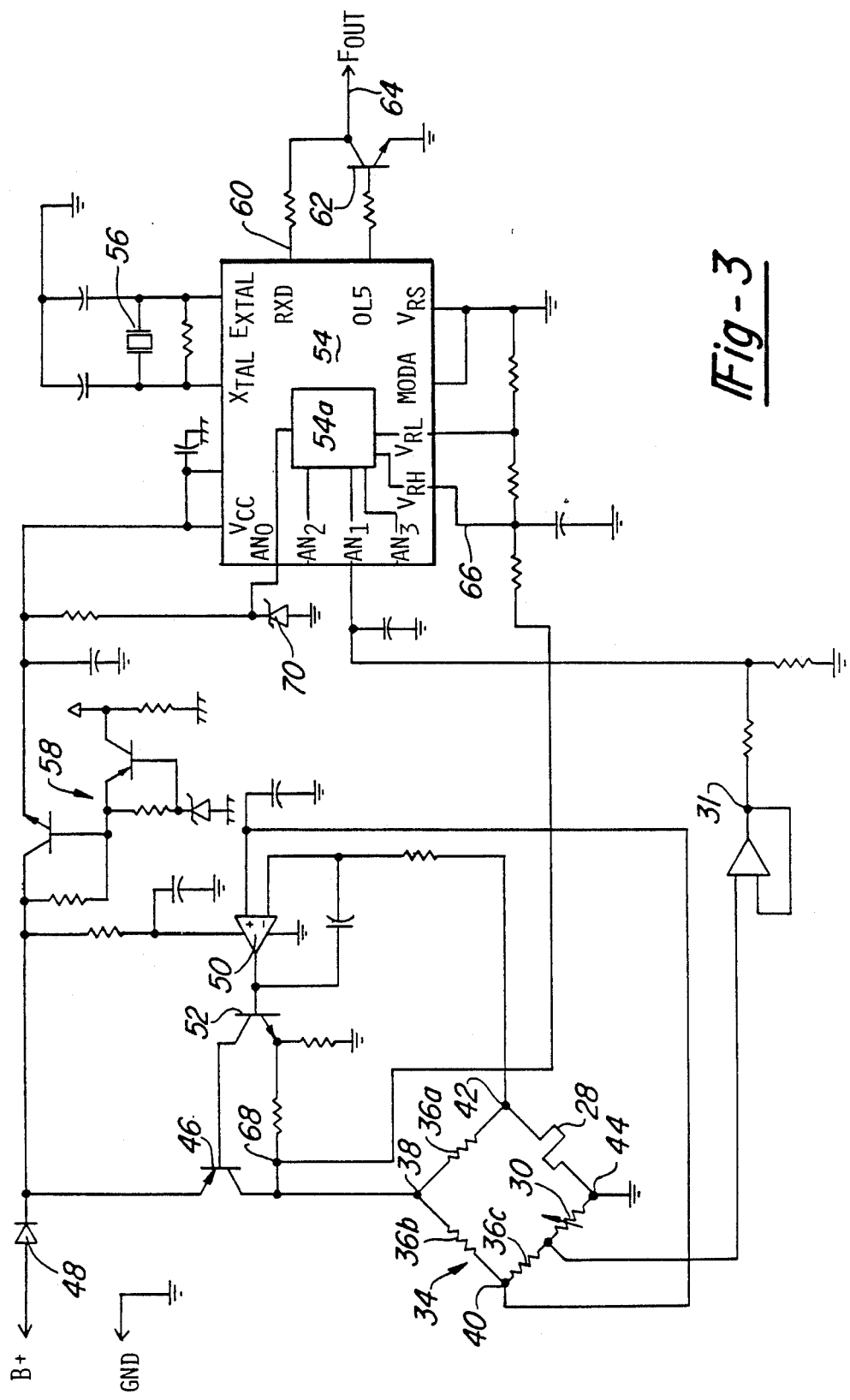
FIG. 3 is schematic diagram of a first embodiment of the airflow sensor and control circuit.

Referring now to FIG. 3, a first embodiment of the control circuit will be discussed. The thermal foil element 28 is included as one element of a Wheatstone bridge circuit 34. The bridge circuit also comprises resistors 36a, 36b, 36c and thermistor 30. Bridge circuit 34 has a supply node 38 and a pair of control nodes 40 and 42. The bridge circuit 34 is grounded as at 44.

A transistor 46 having its emitter coupled through diode 48 to the battery supply B+ provides electrical energy to the bridge circuit. In the presently preferred embodiment the bridge circuit 34, transistor 46 and diode 48 are mounted on the ceramic circuit board 16. The remainder of the components yet to be discussed comprise the control circuit 32 which may be mounted on a separate circuit board as illustrated in FIGS. 1 and 2, or which may be mounted on the ceramic circuit board.

Coupled to the control nodes 40 and 42 is a differential amplifier 50. The output of differential amplifier 50 is coupled through transistor 52 to the transistor 46 in order to control the flow of electrical energy to the bridge circuit 34. The differential amplifier senses the voltage at control nodes 40 and 42 and provides an output error signal when these voltages are not equal. The output signal in turn regulates the quantity of electrical energy applied to the supply node 38 by transistor 46. The differential amplifier thus keeps the bridge circuit balanced by regulation the energy supplied to the bridge circuit.

The control circuit further comprises a microcomputer or microcontroller circuit 54 which may be implemented using a Motorola 68HC11 integrated circuit. In the presently preferred embodiment, a microcomputer chip circuit is employed which includes onboard computer memory circuits, several channels of analog to digital conversion and a serial communication channel. Thus, while not illustrated in FIG. 3, it will be understood that the memory circuits, analog to digital converters, and serial communication circuits are included in the block designated microcomputer 54. As illustrated, microcomputer 54 is interconnected to an external crystal 56 to establish the timing of the microcomputer. A power supply circuit 58 provides power for the microcomputer at pin $V_{cc}$. Microcomputer 54 includes a serial communication port 60 on terminal RXD. A transistor driver 62, responsive to the microcomputer output channel OC5, provides an output to terminal 64 which carries the variable frequency alternating signal indicative of mass airflow. As illustrated, the RXD terminal is also coupled to terminal 64, thus allowing terminal 64 to serve a dual purpose as an input and output terminal. In use, it is an output terminal but maya be used as an input terminal during calibration.

Microcomputer 54 further includes a data input channel 66 which is coupled to the supply node 38 as at 68. The data input channel comprises an analog to digital converter 54a which is preferably supplied on board microcomputer chip. In Fig. 3, the microcomputer has been labeled with the customary terminal designations, where $AN_0$–$AN_3$ correspond to separate individual inputs to the internal analog to digital converters. To provide the reference inputs for the analog to digital converters, the microcomputer includes reference input terminals $V_{RH}$ and $V_{RL}$. In a conventional microcontroller configuration, the $V_{RH}$ reference input terminal would be coupled to a reference voltage source and the analog to digital input terminals $AN_0$–$AN_3$ would be connected to the analog data being measured. In such a configuration, the analog to digital converters provide linear response or linear scaling, dividing the usable analog measuring range into equal increments, one increment for each bit of resolution. In the presently preferred embodiment, the analog to digital input terminal $AN_0$ is connected to a source of reference voltage such as Zener diode reference source 70. The $V_{RH}$ reference input terminal serves as the data input channel 66 and is coupled as at 68 to the supply node 38. This nonstandard connection gives the analog to digital converter a nonlinear response or nonlinear scaling, with better than linear response accuracy at the low end of the analog spectrum. By this arrangement, the analog to digital converters can provide a ten bit resolution using eight bit converters. This achieves the required accuracy using inexpensive eight bit devices. In the vehicle airflow measuring environment, the lower end of the sensors range is the most important, hence scaling the analog to digital converter to place higher resolution at the low end of the analog spectrum places the greatest accuracy where it is most needed.

Ambient temperature data is extracted from thermistor 30 and coupled to the microcomputer analog to digital input terminal AN, through buffer 31.

In operation, it will be assumed that bridge 34 is initially balanced and that no airflow passes the thermal foil element 28. Transistor 46 is biased to supply a predetermined quantity of electrical energy to the bridge circuit, causing the thermal foil element 28 to heat up to a predetermined temperature. In the balanced condition, the voltages at control nodes 40 and 42 are equal and the differential amplifier 50 provides a zero error voltage.

Now assuming an airflow across the thermal foil element 28, the temperature of the element drops in proportion to the rate of flow. As the temperature of the element drops, its resistance decreases which unbalances bridge circuit 34. The voltages at control nodes 40 and 42 are no longer equal and this unbalanced condition is sensed by differential amplifier 50, which provides an error signal in response. The error signal is applied to transistor 52 which in turn changes the bias on transistor 46. Transistor 46 increases the electrical energy applied to the supply node 38 of bridge circuit 34 in response to the change in bias. This causes the thermal foil element to heat up, thereby raising its resistance. When the resistance of the foil element returns to its original no flow resistance, the bridge circuit is again balanced. The differential amplifier thus serves as a bridge control means for sensing the balanced and unbalanced state of the bridge and for controlling the electrical energy applied to the supply node to maintain the bridge in a substantially balanced state.

While the differential amplifier is controlling the energy applied to the bridge to maintain a balanced condition, microcomputer 54, through data input channel 66, measures the voltage at the supply node. In this fashion the microcomputer monitors the quantity of electrical energy being applied to the bridge circuit. Since this quantity of energy is dependent upon the flow rate across the thermal foil element, the microcomputer is in effect measuring the flow rate.

The raw data input at the data input channel is converted from an analog voltage level into a digital signal by the internal analog to digital converter of microcomputer 54. As noted above, the analog to digital converter is configured to provided nonlinear response or nonlinear scaling, so that the lower portion of the analog range is broken down into more bits of resolution than the upper end of the analog range. This provides high resolution where needed at very low cost. Of course, if desired, analog to digital converters of higher resolution can be used, in which case a linear response or linear scaling may be appropriate.

Microcomputer 54 includes internal memory which is preprogrammed to provide instructions for converting the raw digital data into mass airflow data based on a calibration table. In the presently preferred embodiment, the calibration table is in the form of a lookup table which is created for the particular thermal foil element when the sensor is manufactured. In this fashion, any idiosyncrasies in the thermal foil element response can be compensated for on a value by value basis. Furthermore, the shape of the airflow-frequency response curve can be linearized. Using a linear response curve, it is easier and more accurate to interpolate between calibrated data points. This allows the invention to achieve accurate results over the entire working range of the sensor. Also, if desired, temperature data from thermistor 30 can be used by the microcomputer to access lookup tables which compensate for temperature induced variations in the response of the thermal foil element.

The instructions contained in the computer memory are accessed by the microcomputer to convert the raw input data into calibrated data which is sent out on the serial communication port 60. The microcomputer is programmed so that the data is output at port 60 as an alternating signal of variable frequency, wherein the frequency is indicative of the measured mass flow rate. This variable frequency signal thus conforms to the present-day vehicle requirements. If desired, ambient temperature data can be sent out over the same output signal by using the pulse width of upper (or lower) half cycle to indicate temperature. By changing the preprogrammed instructions, the microcomputer can be made to output other types of signals, which makes it comparatively easy to upgrade the sensor design when more sophisticated onboard vehicle computers are used.

Figure 4:
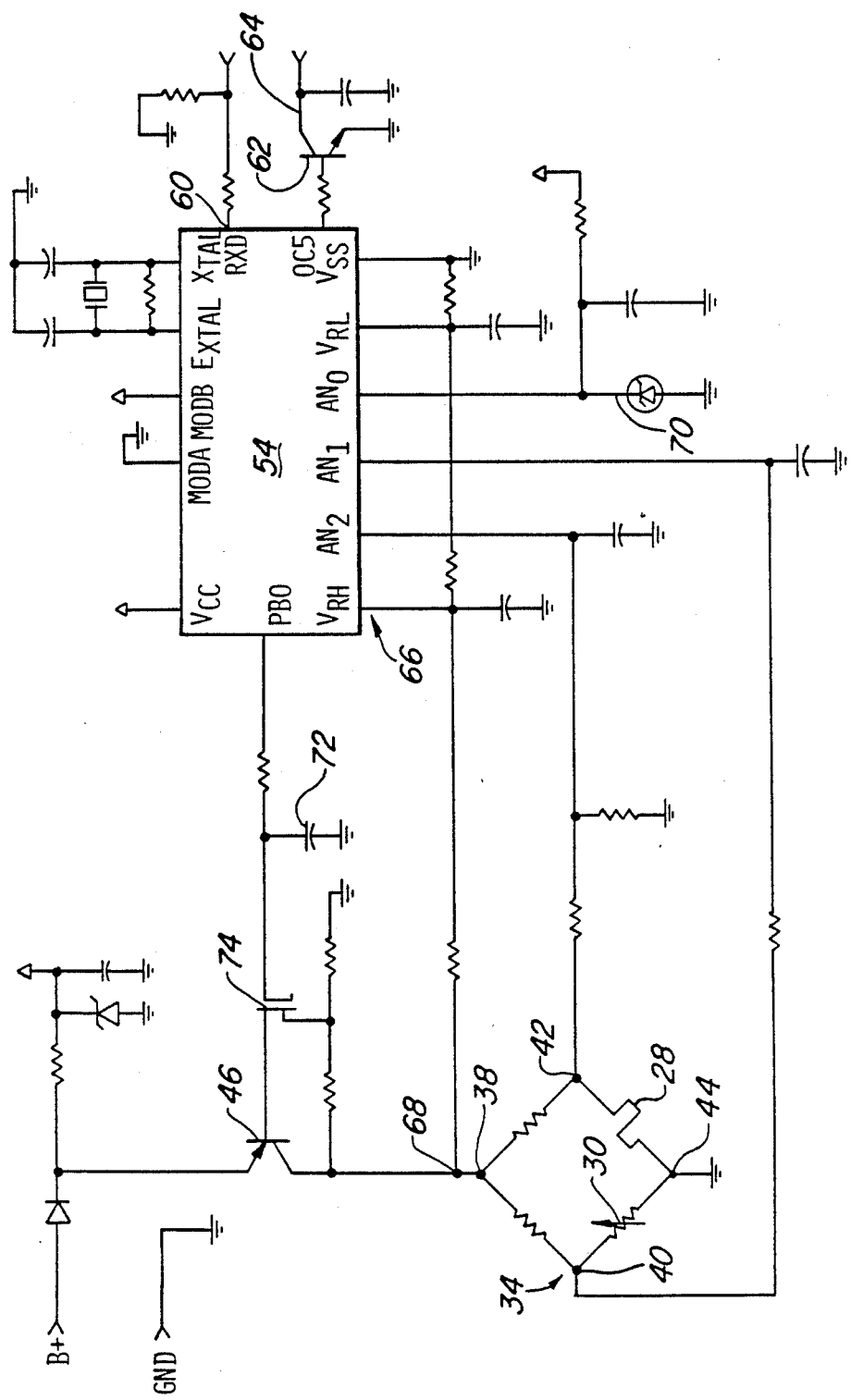
FIG. 4 is a schematic diagram of a second embodiment of the airflow sensor and control circuit.

Another embodiment of the invention is illustrated in FIG. 4. In many respects, the embodiment of FIG. 4 is the same as that of FIG. 3. Hence, only the differences will be discussed in detail. The embodiment of FIG. 4 employs the same or similar bridge circuit 34 with thermal foil element 28. The embodiment also includes microcomputer 54 which provides an output via the OC5 port through transistor 62 to terminal 64. Like the embodiment of FIG. 3, the embodiment of FIG. 4 couples the voltage at 68 to the data input channel 66 of microcomputer 54. As discussed, a Zener diode reference source 70 provides a reference voltage to the analog input terminal $AN_0$. Thus the microcomputer analog to digital converter has a nonlinear response or nonlinear scaling, as discussed above.

In contrast to the embodiment of FIG. 3, the embodiment of FIG. 4 dispenses with the differential amplifier for balancing the bridge. The bridge balancing is instead accomplished by the microcomputer 54. Control nodes 40 and 42 are fed to the $AN_1$ and $AN_2$ analog input terminals. The associated analog to digital converters convert the voltages at nodes 40 and 42 into digital signals which are compared in microcomputer 54. Microcomputer 54 provides a digital error signal which is output on terminal PBO as a pulse width modulated signal, the duty cycle indicative of the error. This pulse width modulated signal is fed to a capacitor 72 which develops a voltage proportional to the duty cycle of the pulse width modulated signal. The capacitor 72 is coupled to transistor 74 which in turn controls the bias on transistor 46. In effect, the microcomputer and capacitor 72 comprise a sample and hold voltage to current converter which applies an offset current to balance the bridge 34.

The sample and hold circuit is able to balance the bridge with much accuracy. Microcomputer 54 may be preprogrammed to compensate for unbalanced bridge resistors during calibration. Thus this embodiment can be calibrated to a balanced state using fewer or no laser trimmed resistors.

From the foregoing it will be appreciated that the control circuits of the invention provide a convenient microcomputer-based circuit which is readily calibrated by programming the memory circuits with the appropriate calibration values. Expensive laser trimming is minimized or eliminated. The circuit also can be made quite accurate by tailor fitting the calibration lookup table to each individual thermal foil element and by conforming the output response curves to fit smooth, well defined functions such as linear functions which are more accurate when interpolating between measured data points. Temperature compensation can also be implemented using lookup correction tables.

While the invention has been described in connection with its presently preferred embodiments, it will be understood that the invention is capable of modification and change without departing from the spirit of the invention as set forth in the appended claims.

What is claimed is:

1. A control circuit for an airflow sensor of the type employing a flow sensing bridge having a thermal element which senses airflow and provides an indication of airflow as a function of electrical energy applied to said bridge, said bridge having a supply node to which said electrical energy is applied and said bridge having first and second control nodes for providing an indication of the balanced and unbalanced state of said bridge, the control circuit comprising:

a differential amplifier circuit means for coupling to a source of electrical energy having first and second inputs coupled to said first and second control nodes and being coupled to said supply node, for sensing the balanced and unbalanced state of said bridge and for controlling the electrical energy applied to said supply node to maintain said bridge in a substantially balanced state;

a fixed voltage reference source;

said supply node being at a voltage which varies in accordance with the electrical energy applied to said bridge;

a microcomputer having an analog to digital converter, having a memory circuit and having a serial communication output channel;

said analog to digital converter having an analog signal input channel and a reference voltage input channel;

said analog to digital converter being of the type capable of receiving an analog signal within a predetermined voltage range at said analog signal input channel and capable of receiving a fixed voltage at said reference voltage input channel;

said analog to digital converter being further of the type that when receptive of an analog signal within a predetermined voltage range at said analog signal input channel when receptive of a fixed voltage at said reference voltage input channel said analog to digital converter divides said voltage range into substantially equal increments, each increment corresponding to a different binary digit;

in said control circuit said reference voltage input channel of said analog to digital converter being coupled to said supply node to sense the electrical energy applied to said supply node as characterized by the voltage at said supply node and said analog signal input channel being coupled to said fixed voltage reference source;

said analog to digital converter when so coupled to said supply node and to said fixed voltage reference source being operable to divide said range of supply node values into substantially nonequal increments, each increment corresponding to a different binary digit;

said microcomputer being receptive of said binary digits and producing a signal on said serial communication output channel which is indicative of said binary digits and thereby indicative of measured mass airflow.

2. The control circuit of claim 1 wherein said memory circuit is preprogrammed to contain a lookup correction table for converting said first signal into said second signal.

3. The control circuit of claim 1 wherein said memory circuit is preprogrammed to contain a lookup correction table for substantially compensating for inaccuracies inherent in said mass airflow sensor.

4. The control circuit of claim 1 further comprising temperature responsive means coupled to said microcomputer and wherein said memory circuit is preprogrammed to provide said microcomputer with instructions for substantially compensating for inaccuracies in said mass airflow sensor due to ambient temperature variations.

5. A control circuit for an airflow sensor of the type employing a flow sensing bridge having a thermal element which senses airflow and provides an indication of airflow as a function of electrical energy applied to said bridge, and said bridge having a supply node to which said electrical energy is applied and said bridge having first and second control nodes for providing an indication of the balanced and unbalanced state of said bridge, the control circuit comprising:

a microcomputer having first and second data input channels, having a memory circuit, having an analog to digital converter, having a serial communication output channel and a second output channel;

said first and second data input channels being coupled to said first and second control nodes for providing said microcomputer with an indication of the balanced and unbalanced state of said bridge;

said microcomputer generating and providing at said second output channel balancing signals in response to said indication of the balanced and unbalanced state;

a bridge control circuit coupled to said second output channel and to said supply node and having a terminal for coupling to a source of electrical energy for controlling the electrical energy applied to said supply node in response to said balancing signals from said microcomputer;

a fixed voltage reference source;

said supply node being at a voltage which varies in accordance with the electrical energy applied to said bridge;

said analog to digital converter having an analog signal input channel and a reference voltage input channel;

said analog to digital converter being of the type capable of receiving an analog signal within a predetermined voltage range at said analog signal input channel and capable of receiving a fixed voltage at said reference voltage input channel;

said analog to digital converter being further of the type that when receptive of an analog signal within a predetermined voltage range at said analog signal input channel and when receptive of a fixed voltage at said reference voltage input channel said analog to digital converter divides said voltage range into substantially equal increments, each increment corresponding to a different binary digit;

in said control circuit said reference voltage input channel of said analog to digital converter being coupled to said supply node to sense the electrical energy applied to said supply node as characterized by the voltage at said supply node and said analog signal input channel being coupled to said fixed voltage reference source;

said analog to digital converter, when so coupled to said supply node and to said fixed voltage reference source, being operable to divide said range of supply node values into substantially nonequal increments, each increment corresponding to a different binary digit;

said microcomputer being receptive of said binary digits and producing a signal on said serial communication output channel which is indicative of said binary digits and thereby indicative of measured mass airflow.

6. The control circuit of claim 5 wherein said memory circuit is preprogrammed to contain a lookup correction table for converting said first signal into said second signal.

7. The control circuit of claim 5 wherein said memory circuit is preprogrammed to contain a lookup correction table for substantially compensating for inaccuracies inherent in said mass airflow sensor.

8. The control circuit of claim 5 further comprising temperature responsive means coupled to said microcomputer and wherein said memory circuit is preprogrammed to provide said microcomputer with instructions for substantially compensating for inaccuracies in said mass airflow sensor due to ambient temperature variations.

9. An airflow sensor for a vehicle having an onboard computer comprising:

a flow confining path;

a flow sensing bridge disposed in said flow confining path, said bridge having a thermal element which senses mass airflow and provides an indication of airflow as a function of electrical energy applied to said bridge, said bridge having a thermal element which senses mass airflow as a function of electrical energy applied to said bridge, said bridge having a supply node to which said electrical energy is applied and said bridge having at least one control node for providing an indication of the balanced and unbalanced state of said bridge;

a bridge control means coupled to a source of electrical energy and coupled to said supply node and to said control node for sensing the balanced and unbalanced state of said bridge and for controlling the electrical energy applied to said supply node to maintain said bridge in a substantially unbalanced state;

an analog to digital converter means coupled to said bridge for sensing the electrical energy applied to said supply node and for providing a digital signal indicative thereof;

a microcomputer coupled to said analog to digital converter for receiving said digital signal and having an output channel, and having a preprogrammed memory circuit a fixed voltage reference source;

said supply node being at a voltage which varies in accordance with the electrical energy applied to said bridge;

said analog to digital converter having an analog signal input channel and a reference voltage input channel;

said analog to digital converter being of the type capable of receiving an analog signal within a predetermined voltage range at said analog signal input channel and capable of receiving a fixed voltage at said reference voltage input channel;

said analog to digital converter being further of the type that when receptive of an analog signal within a predetermined voltage range at said analog signal input channel and when receptive of a fixed voltage at said reference voltage input channel said analog to digital converter divides said voltage range into substantially equal increments, each increment corresponding to a different binary digit;

in said control circuit said reference voltage input channel of said analog to digital converter being coupled to said supply node to sense the electrical energy applied to said supply node as characterized by the voltage at said supply node and said analog signal input channel being coupled to said fixed voltage reference source;

said analog to digital converter, when so coupled to said supply node and to said fixed voltage reference source, being operable to divide said range of supply node values into substantially nonequal increments, each increment corresponding to a different binary digit;

said microcomputer being receptive of said binary digits and producing a signal on said output channel which is indicative of said binary digits and thereby indicative of measured mass airflow.

10. The sensor of claim 9 wherein said memory circuit is preprogrammed to provide said microcomputer with instructions for converting said digital signal into an alternating signal of variable frequency, the frequency being indicative of the measured mass airflow.

11. The sensor of claim 9 wherein said bridge has first and second control nodes and said bridge control means comprises a differential amplifier means having first and second inputs for coupling to said first and second control nodes and having an output, and wherein said bridge control means further comprises energy control means for coupling to a source of electrical energy and coupled to said output of said differential amplifier means for controlling the electrical energy applied to said supply node to maintain said bridge in a substantially balanced state.

12. The sensor claim 9 wherein said control means comprises sample and hold means coupled to said control node and to said supply node and having means for coupling to a source of electrical energy, for sampling the balanced and unbalanced state of said bridge and for controlling the electrical energy applied to said supply node to maintain said bridge in a substantially balanced state.

13. The sensor of claim 12 wherein said sample and hold means is implemented by said microcomputer.

* * * * *

UNITED STATES PATENT AND TRADEMARK OFFICE
CERTIFICATE OF CORRECTION

PATENT NO. : 4,884,215

DATED : November 28, 1989

INVENTOR(S) : James A. Zboralski et al.

It is certified that error appears in the above-identified patent and that said Letters Patent is hereby corrected as shown below:

Column 4, line 62, delete "regulation" and insert therefor -- regulating --.

Column 5, line 18, delete "maya" and insert therefor -- may --.

Column 6, line 34, delete "provided" and insert therefor -- provide --.

Column 9, line 10, Claim 5, after "bridge," (first occurrence) delete "and."

Column 12, line 12, Claim 12, after "sensor" insert -- of --.

Signed and Sealed this

Twentieth Day of November, 1990

Attest:

HARRY F. MANBECK, JR.

*Attesting Officer*  *Commissioner of Patents and Trademarks*